(12) United States Patent
Skipor

(10) Patent No.: US 9,470,399 B1
(45) Date of Patent: Oct. 18, 2016

(54) LIGHT-EMITTING POLYMER FILMS, ARTICLES CONTAINING SAME, AND METHODS OF MAKING

(71) Applicant: Amazon Technologies, Inc., Reno, NV (US)

(72) Inventor: Andrew Frederick Skipor, West Chicago, IL (US)

(73) Assignee: Amazon Technologies, Inc., Reno, NV (US)

( * ) Notice: Subject to any disclaimer, the term of this patent is extended or adjusted under 35 U.S.C. 154(b) by 391 days.

(21) Appl. No.: 14/106,268

(22) Filed: Dec. 13, 2013

(51) Int. Cl.
| | | |
|---|---|---|
| *H01B 1/12* | (2006.01) | |
| *B32B 3/10* | (2006.01) | |
| *F21V 11/16* | (2006.01) | |
| *G02F 1/1335* | (2006.01) | |

(52) U.S. Cl.
CPC ......... *F21V 11/16* (2013.01); *G02F 1/133617* (2013.01)

(58) Field of Classification Search
CPC .................................. G02B 1/04; G02B 1/00
USPC .................................................. 313/501–512
See application file for complete search history.

(56) References Cited

U.S. PATENT DOCUMENTS

| | | | | |
|---|---|---|---|---|
| 7,018,713 | B2 * | 3/2006 | Padiyath | B32B 27/08 428/411.1 |
| 9,167,659 | B2 * | 10/2015 | Coe-Sullivan | H05B 33/145 |
| 9,199,842 | B2 * | 12/2015 | Dubrow | B82Y 20/00 |
| 2004/0121146 | A1 * | 6/2004 | He | C08J 7/06 428/332 |
| 2004/0209126 | A1 * | 10/2004 | Ziegler | B32B 27/06 428/702 |
| 2010/0167011 | A1 * | 7/2010 | Dubrow | C09K 11/025 428/141 |
| 2010/0181582 | A1 * | 7/2010 | Li | H01L 33/44 257/91 |
| 2010/0272933 | A1 * | 10/2010 | McCormick | C09J 7/0296 428/34.1 |
| 2013/0189803 | A1 * | 7/2013 | Nasaani | C09K 11/02 438/27 |

\* cited by examiner

*Primary Examiner* — Tracie Y Green
(74) *Attorney, Agent, or Firm* — K&L Gates LLP

(57) ABSTRACT

Light-emitting film having low or no degradation of light emission characteristics at film side surfaces, methods of making, and displays and electronic devices such as electronic readers formed with the light-emitting film. In one instance, the light-emitting film contains quantum dots in a polymeric matrix, has side surfaces protected with one or more oxygen and moisture barrier layers, and may be formed using transfer molding.

18 Claims, 6 Drawing Sheets

LIGHT-EMITTING POLYMER FILMS, ARTICLES CONTAINING SAME, AND METHODS OF MAKING

BACKGROUND

Light-emitting polymer films have been used in few electronic devices such as electronic readers and tablet computers to date. These films can suffer from edge luminosity degradation, limiting the size of useful display for the electronic device.

Both active and passive light-emitting polymer films can suffer image quality degradation over time, especially along their edges. An active light-emitting film does not require an independent light source to generate light. An active light-emitting film typically generates light using an electrical current applied to the film. A purely passive light-emitting film contains a material which absorbs light from a separate light source and emits light at a different wavelength. While the light emitter in an active film having only active light elements is quite different in composition from the light emitter in a purely passive film, both the active light-emitting film and passive light-emitting film can suffer from edge luminosity degradation.

Provided herein is a light-emitting polymer film that may be single- or multi-layer as well as methods of making and objects made using the light-emitting polymer film.

DETAILED DESCRIPTION

In the following description, reference is made to the accompanying drawings which illustrate certain embodiments of the invention. It is understood that other embodiments may be utilized and mechanical, compositional, structural, and/or electrical operational changes may be made without departing from the spirit and scope of the present disclosure. The following detailed description is therefore not to be taken in a limiting sense, and the scope of the embodiments of the present invention is defined only by the claims of the issued patent.

Various light-emitting polymer films, methods of making these films, and objects formed using these films are described below. These films in particular have side surfaces sealed with an oxygen and moisture barrier layer, and in some instances the oxygen and moisture barrier layer has a light-reflective material of sufficient thickness and reflection to reflect light generated by the light-emitting polymer film. The reflected light exits a major surface of the light-emitting polymer film, thereby avoiding light loss at film side surfaces.

One particular film is discussed first to explain various features of a preferred embodiment.

Figure 1A:
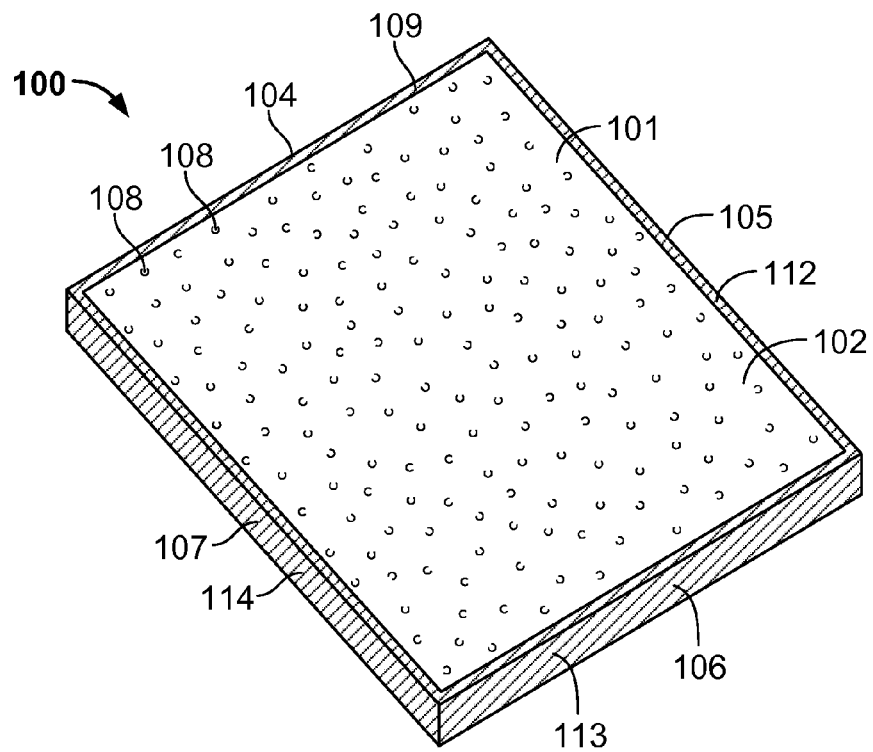
FIG. 1A is a perspective view of a particular light-emitting film having a single oxygen and moisture barrier film on each side surface of the light-emitting film.
Figure 1B:
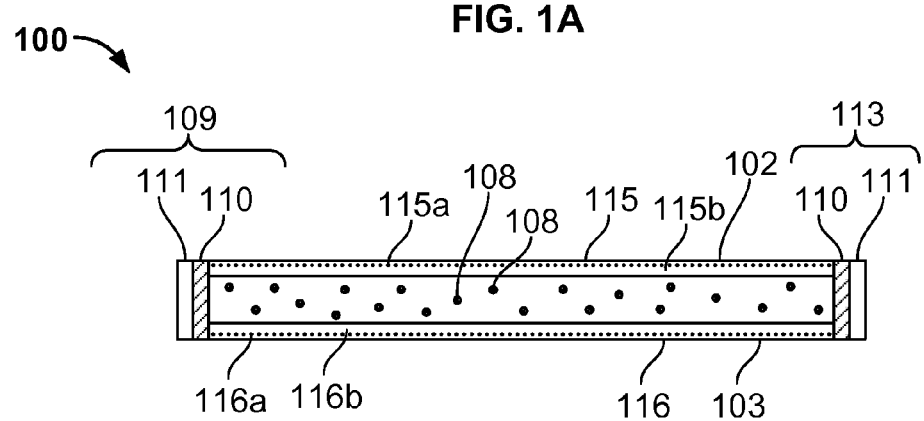
FIG. 1B is a cross-sectional view of a variation of a light-emitting film and illustrates an oxygen and moisture barrier film that was applied to each side surface.
Figure 1C:
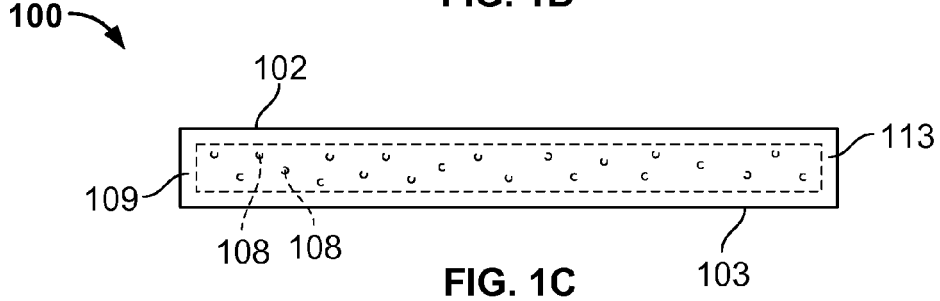
FIG. 1C is a side view of the film of FIG. 1A and depicts how the oxygen and moisture barrier film along all side surfaces covers both the side surface of the solid polymeric matrix and the adjacent edges of the barrier layers on the first and second major faces of the polymeric matrix.

FIGS. 1A, 1B, and 1C depict various light-emitting films 100. Light-emitting film 100 has a solid organic polymeric matrix 101, which has first major surface 102, second major surface 103 which, in this instance, is parallel to the first major surface, first side surface 104, second side surface 105, third side surface 106, and fourth side surface 107. Miscible polymers are typically polymers or other materials that mix readily and blend into one another to form a substantially homogeneous material with little variation through it. Organic polymeric matrix 101 contains a dispersed phase 108 which has low miscibility or solubility in the solid organic polymeric matrix 101 so that the dispersed phase 108 is present predominantly or exclusively as discrete inclusions of the second phase in the matrix. Dispersed phase 108 contains quantum dots (not shown for sake of clarity) that convert light of one wavelength into light of one or more other wavelengths. Dispersed phase in this instance is a liquid such as silicone that has low solubility in polymer matrix 101, the matrix in this case being a cured epoxy polymer. The epoxy polymer may be at least substantially transparent to UV, visible, and/or infrared light. The epoxy polymer may be a two-part epoxy that cures upon mixing at room temperature or elevated temperature with a hardener to form the polymer, or the epoxy polymer may be an epoxy that cross-links upon exposure to ultraviolet light for instance. Examples of such transparent epoxy polymers that can be used include amorphous polymers such as novolac epoxy resins formed by the reaction of a phenolic novolac resin with epichlorohydrin and other optional comonomers, a diglycidyl ether of bisphenol-A, and 3M™ Scotch-Weld™ epoxy adhesive (toughened or not toughened).

First side surface 104 has an oxygen and moisture barrier layer 109 that has been secured to the solid organic polymeric matrix 101 in a mold. Oxygen and moisture barrier layer 109 has a foil 110 that helps prevent oxygen and moisture ingress through first side surface 104. Barrier layer 109 may be a metal alone or may optionally be a multilayer film that contains a metal and also contains e.g. a polymer layer 111 that adheres to solid organic polymeric matrix 101 to help secure metal foil 110 to first side surface 104. Second side surface 105 likewise has an oxygen and moisture barrier layer 112, third side surface 106 similarly has an oxygen and moisture barrier layer 113, and fourth side surface 107 also has an oxygen and moisture barrier layer 114. In this instance, oxygen and moisture barrier layers 112, 113, and 114 are identical in construction to oxygen and moisture barrier layer 109. Oxygen and moisture barrier layers 109, 112, 113, and 114 may be part of one continuous linear or endless strip of material that seals side surfaces 104, 105, 106, and 107 or may be two, three, or four individual strips that seal side surfaces 104, 105, 106, and 107. The position of foil and polymer layer may of course be reversed, so that foil would be feature 111 and polymer layer (composed of one or more polymer layers) would be feature 110. The light-emitting film can have a single strip or multiple strips of film composed of both polymer and metal films as discussed herein, and a polymeric face of the strip(s) may be placed in contact with side surfaces of the solid organic polymeric matrix and e.g. heated and/or adhered via cross-linking so that the strips' polymer adheres to polymer of the matrix.

The foil 110 of the oxygen and moisture barrier layer 109 may, for instance, be any one or more of aluminum, copper, nickel, silver, gold, chromium, or other metal alone, combined as an alloy, or in layers in which one layer of e.g. light-reflective metal is plated with another metal to make the film more durable and/or resistant to oxygen and moisture. A metal foil may be quite thin and may have a thickness of about 2 to about 20 microns, for instance. The film depicted in FIG. 1 is about 10 microns in thickness.

Light-emitting film 100 also has protective barrier layers 115 and 116 on the first major surface and second major surface, respectively, in this particular example. This barrier layer has metal oxide particles 115a, 116a and polymer barrier layer 115b, 116b. The polymer barrier layer in this instance is poly(ethylene terephthalate) ("PET"), and the metal oxide particles are e.g. $Al_2O_3$ or other metal oxide. The metal oxide particles may be distributed in a continuous layer across the protective barrier layers.

A light-emitting film may therefore comprise a solid polymeric matrix, discrete light emitters in the form of organic light-emitting devices or quantum dots, for instance, and an oxygen and moisture barrier layer along one or more side surfaces of the light-emitting film at boundaries of the film's major faces. The light-emitting film may have light emitters such as quantum dots in a separate phase (such as a solid, polymeric, or liquid phase) dispersed in the solid polymeric matrix, and the light-emitting film may also optionally have an oxygen and moisture barrier layer on each of the film's major faces. A light-emitting film may be free-standing or may be mounted to e.g. a backing such as a piece of glass or a reflector.

The solid polymeric matrix of a light-emitting film such as polymer matrix may be flexible, or the matrix may be rigid. The polymeric matrix is typically not silica glass, although the light-emitting film may additionally have a layer of silica glass adjacent to a surface such as a major surface.

The solid polymeric matrix for a passive light-emitting film may be an organic polymer such as an epoxy polymer as discussed above. Other matrix materials may be, e.g., poly(methyl methacrylate), poly(lauryl methacrylate), and/or nylon such as nylon-6. The solid polymeric matrix of a passive light-emitting film may instead be an inorganic polymer such as a silicone polymer and/or a sol-gel such as tetraethyl orthosilicate and/or poly(dimethylsiloxane).

The solid polymeric matrix for an active light-emitting film such as an organic light-emitting device may be an organic polymer such as a polyimide, poly(p-phenylene vinylene), poly(naphthalene vinylene), and/or polyfluorene.

A light-emitting film may have a thickness between about 100 and 500 microns for instance, such as 100, 150, 200, 250, 300, 350, 400, 450, or 500 microns. The matrix may have any shape and is typically a regular shape when viewed from above such as a circle, triangle, square, rectangle, or other shape. The shape may, for example, be rectangular and have a size suited for a display on a mobile electronic device such as a phone or portable computer such as a tablet or laptop computer. A rectangular light-emitting film may have a diagonal length of about four inches (about 10.2 cm) to about 10 inches (about 25.4 cm), for instance.

An oxygen and moisture barrier layer along a side surface of the light-emitting film may be a single metal layer such as a metal foil, for instance. The metal layer itself may be a single metal layer or multiple metal layers as discussed previously. The metal of the layer closest to the solid polymeric matrix may be light reflective (90° reflectance>75% in the visible wavelength range of about 400 to 700 nm, for instance, and 90° reflectance is preferably at least about 85% or 90%. In some instances, the metal may reflect at least about 75% in the wavelength range of about 400-1000 nm, and preferably reflectance in this range is at least about 85% or 90%). A metal layer may have a thickness between about 0.02 micron and 0.1 micron, for instance, and may be e.g. about 0.03 to about 0.07 micron in thickness. Suitable metals for forming the metal layer include aluminum, copper, nickel, silver, gold, chromium, or other metal alone, combined as an alloy, or in layers in which one layer of e.g. light-reflective metal is plated with another metal to make the film more durable and/or resistant to oxygen and moisture. A metal layer on a side surface may include a foil placed upon the side surface, and/or a metal layer may include a metal deposited on the side surface to form a continuous layer across the side surface.

A reflective metal layer such as aluminum, silver, or gold provides very good light reflection within the light-emitting polymer layer, reducing the amount of light lost at film edges and helping to produce a brighter display. Likewise, a polymer coated on side surfaces and having an index of refraction less than the refractive index of the solid organic polymeric matrix provides good reflection of light within the light-emitting polymer layer, avoiding loss at film edges and thereby providing a brighter display.

An oxygen and moisture barrier layer may be a composite film. One such composite film is composed of a metal film and a polymer film adhering to the metal film as described above.

The polymer may be an organic polymer. This polymer itself may have low oxygen and moisture transmission rates. One example is a polymer layer having metal oxide particles formed at and/or embedded in a major surface of the polymer (as e.g. a continuous layer of particles) to provide low oxygen and moisture transmission rates. As noted previously, metal oxide particles may be one or more metal oxides selected from $Al_2O_3$, or $T_iO_2$, for example. Particles such as a nanoscale clay (e.g. a layered or pillared clay such as a smectite (e.g. montmorillonite)) may be used in addition to or instead of metal oxide particles. The particles may be unmodified or may be modified to make the clay particles hydrophobic. For instance, clay particles may have a polymer intercalated into layers of the particles to prevent moisture and/or oxygen from migrating through inter-layer space.

Another example of an oxygen and moisture barrier layer is a metalized polymer layer, in which the polymer has a very thin (e.g. 0.00005 mm thick) layer of metal deposited upon it and optionally contains metal oxide particles as discussed above. The polymer of this barrier layer may additionally or instead have very good adhesion to the solid polymeric matrix and/or any layers on the major faces of the solid polymeric matrix. A polymer of this barrier layer may be the same as or sufficiently similar to the polymer of the solid polymeric matrix and/or a barrier layer on a major surface of the solid polymeric matrix to enable the polymers to easily join with one another and help form a more continuous protective film along all surfaces and side surfaces of the light-emitting film. For instance, the polymer deposited on the side surface may be a poly(ethylene terephthalate), a polyether that can be linked to a solid polymeric matrix formed with a polyether, or other polymer. Each of the side surfaces may have its own individual film placed upon it. Alternatively, a single endless polymer layer may be formed around all side surfaces. A polymer layer on a side surface typically has a thickness between about 5 and 25 microns and may be, e.g., at least about 10, 15, or 20 microns. Examples of polymers that may be used in forming the barrier layer include biaxially-oriented polypropylene, polyester, cast polypropylene, polyvinyl chloride, and/or ethylene-vinyl alcohol copolymer.

An oxygen and moisture barrier layer may provide a light-emitting film with a sufficiently low permeability to oxygen and moisture to reduce a rate of oxygen ingress to quantum dots and/or organic light emitting devices from a surrounding ambient by at least one order of magnitude compared to a comparative light-emitting film that is otherwise identical but lacks the oxygen barrier layer. The oxygen and/or water transmission rates may be reduced by at least one order of magnitude.

The water vapor transmission rate (WVTR) may be less than about $10^{-6}$ g/m$^2$/day, and the oxygen transmission rate (OTR) may be less than about $10^{-3}$ cm$^3$/m$^2$/day, for instance.

An oxygen and moisture barrier layer as applied to a side surface may have an oxygen transmission rate of no more than about 1.5 mL/m$^2$·day as measured under ASTM D3985-05 (2010) using e.g. an OX-TRAN® Model 2/21 ML system for oxygen permeation testing. The oxygen transmission rate may be no more than about 1.2, 1.0, 0.8, 0.5, 0.3, 0.2 or 0.1 mL/m$^2$·day in various embodiments.

A side surface barrier layer may additionally or instead have a water transmission rate of no more than about 1.0 g/m$^2$·day as measured under ASTM F1249-06 (2011) using e.g. a PERMATRAN-W® Model 1/50 for water vapor permeation testing. The water transmission rate may be no more than about 0.8, 0.5, 0.3, 0.2 or 0.1 mL/m$^2$·day in various embodiments.

Following are some examples of water and oxygen transmission rates for a metal foil and for various films taken from literature:

|  | Moisture (g/m$^2$ · day) | Oxygen (mL/m$^2$ · day) |
| --- | --- | --- |
| PET film, 12.7 μm | 31 | 465 |
| Metalized PET | 0.8 | 1.2 |
| Aluminum foil 6 μm | 0 | 0 |

The light-emitting film may be a passive light-emitting film that requires a separate light source for the film to emit light. A passive light-emitting film may contain quantum dots. A quantum dot is a nanoparticle of metal atoms or a nanocrystalline particle of a semiconductor material that is sufficiently small that the particle exhibits quantum mechanical properties. The electrons of a quantum dot are typically confined in all three dimensions to a length scale of the order of the electron Fermi wavelength. Semiconductor quantum dots may be e.g. Groups III-V and/or Groups II-VI quantum dots. Quantum dots include binary compounds and ternary alloys such as CdSe, InP, GaAs, and InGaAs and/or core-shell quantum dots such as (CdSe)ZnSe, (CdSe)ZnS, (InP)InAs, (GaAs)InAs, (ZnO)MgO, and/or (InP)ZnS, and/or one or more zinc selenides having a ZnSe core, ZnS shell doped with guest ions such as Cu and/or Mn and optionally having a ZnS cap (e.g. ZnSe/ZnMnS/ZnS). The quantum dots are preferably dispersed within a polymer or liquid carrier material that can form a disperse phase in the polymeric matrix. Quantum dots may absorb e.g. blue, violet, or ultraviolet light emitted by e.g. LEDs in a light bar, OLEDs (in a light bar and/or as part of an active light-emitting film), or an electroluminescent material such as zinc sulfide doped with copper contained in the matrix, and the quantum dots may emit red (e.g. 610 nm), green (e.g. 545 nm), and/or blue (e.g. 445 nm) light. The quantum dots may have organic ligands on their surfaces that improve their compatibility in various solvents or carrier materials such as those discussed herein. The ligands may be hydrophobic, hydrophilic, or a combination of these.

A light-emitting film may have or be a layer comprised of organic light-emitting devices (OLEDs) having an active matrix or a passive matrix. Side surfaces of these layers may be sealed by any of the methods discussed below, providing light-emitting polymer layers as described herein and having OLEDs in place of or in addition to quantum dots. A light-emitting film such as one having OLEDs that emit light without requiring another light source is an active light-emitting film.

As discussed above, a light-emitting film may have one or more layers of other materials on or within it. For instance, a separate oxygen and moisture barrier layer may overlay the first major surface and/or the second major surface of the solid polymeric matrix. This barrier layer may be e.g. a layer of metal oxide and/or a barrier film such as a poly(ethylene terephthalate) film as discussed previously.

A light-emitting film may therefore be a single layer of solid polymeric matrix with oxygen and moisture barrier layer applied to its side surface(s). A light-emitting film may instead be e.g. a three-layer structure in which two barrier layers sandwich the solid polymeric matrix on major faces of the matrix, with oxygen and moisture barrier layer applied to its side surface(s). A light-emitting film may of course have more layers or fewer than three layers.

A light-emitting film may be made a number of ways. A solid polymeric matrix containing quantum dots can be made by dispersing a material containing the quantum dots within the polymeric matrix during its formation. A polymer will often form a disperse phase within another polymer where the two polymers are immiscible due to their significantly different polarities. Examples of quantum dot-containing polymers include poly(methyl methacrylate) or other polymer having a melt point less than the temperature at which quantum dots are inactivated. Suitable polymers will often be compatible with organic ligands on surfaces of the quantum dots. The extent of polymer compatibility that can be tolerated for any given application may be tested by dispersing the polymers in e.g. a co-rotating twin screw extruder, forming a film, and testing the resultant film for its light emission properties.

A liquid will form a disperse phase within a polymer where the rate of dissolution of liquid and polymer is sufficiently low that the liquid remains as droplets within the polymer when the polymer solidifies and/or cross-links. An unmodified silicone oil typically does not dissolve in a polyether polymer, for instance. Silicone oil droplets may be dispersed within a solution or dispersion of monomers or prepolymer by various methods for creating an emulsion such as by intense mixing or by sonication, for instance.

Figure 4A:
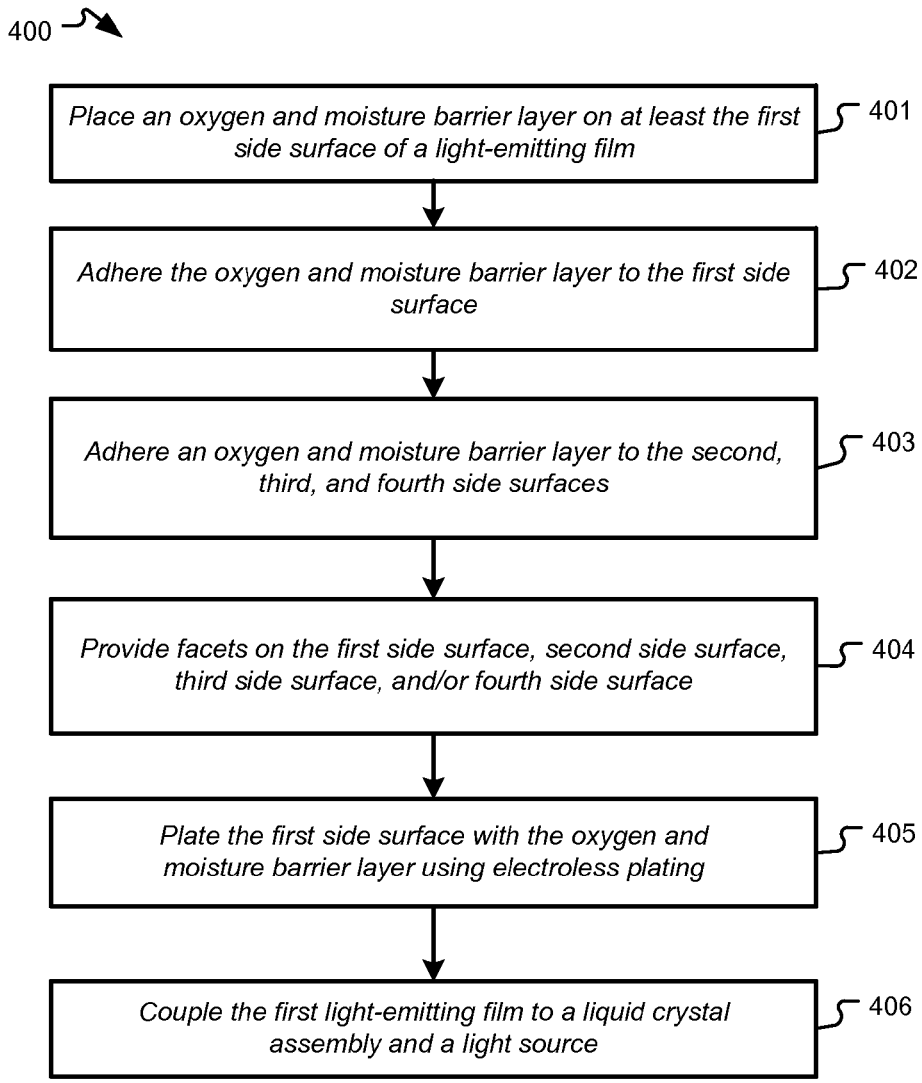
FIG. 4A and FIG. 4B are flowcharts of methods described below.

FIG. 4A summarizes a method 400 of making a light-emitting film having an oxygen and moisture barrier layer on a side surface, in accordance with embodiments of the present invention. In step 401, an oxygen and moisture barrier layer is positioned on at least a first side surface of a light-emitting film. In step 402, the oxygen and moisture barrier layer is adhered to the side surface. Various methods of applying and adhering the barrier layer to the surface may be used, such as, for example, by applying a metal foil using mechanical pressure, using sonication, heating the light-emitting film and the applied barrier layer, micro-transfer molding the barrier layer to the side surface, and/or applying a metal-containing ink to the side surface.

Figure 1D:
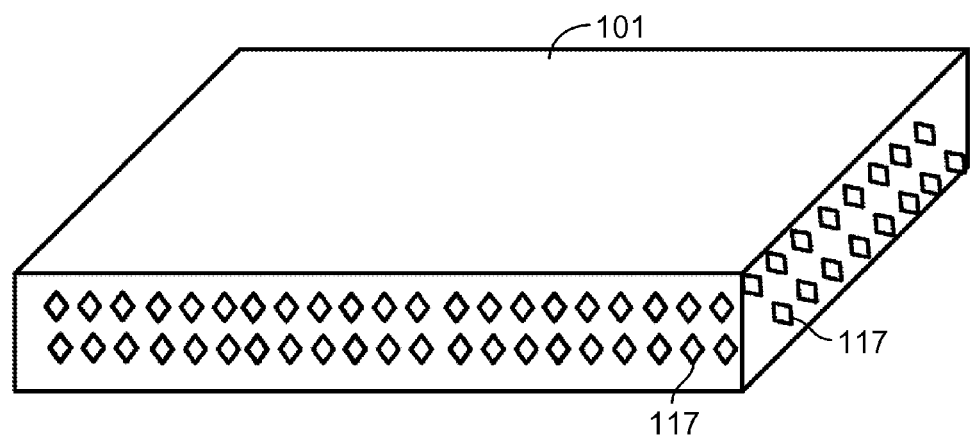
FIG. 1D is a perspective view of the light-emitting film and illustrates facets on side surfaces of the light-emitting film.

In step 403, a metal foil may be applied to additional side surfaces and optionally to a small portion of a major surface immediate adjacent to a side surface of the light-emitting film and secured to the side surface and major surface using e.g. pressure and heat. In step 404, facets may be formed on one or more side surfaces and/or portion of a major surface to roughen or increase the surface area of the surface. The facets may be formed using a variety of methods, such as, e.g., hot-stamping to create facets 117 as depicted in FIG. 1D. A faceted surface can help to adhere a metal foil to the side surface by providing a larger and more variable surface for adhesion. Alternatively, a roller having small dull teeth may be used to create facets in the light-emitting film to laminate the metal foil to the side surface and optionally to the small portion of a major surface immediately adjacent to the side surface. A roller may also be used to push the metal foil onto the light-emitting film to help secure the foil to the polymer, especially where the side surface and/or major surface is faceted. The metal foil may or may not have a polymer film layer on it. If the metal foil has a polymer film layer, a roller, press, or other mechanical force applicator and/or sonicator may help mix portions of the polymer film layer with the polymer of the side surface and/or major surface, intertwining polymer chains of each to promote better adhesion, particularly if the film and/or small portion of the major surface are warmed and if the polymers are thermoplastic. A sonicator applies ultrasonic energy to the polymers, heating them so that their polymer chains melt and/or react with one another.

A material such as a metal foil can be difficult to apply and adhere to film side surfaces reliably. Even when the metal foil and/or side surface-applied polymer are annealed and pressed to the side surface, small portions of the metal foil and/or side surface-applied polymer may possibly not adhere sufficiently for a desired level of long-term reliability. Micro-scale transfer molding can be used to adhere a foil to side surfaces of a light-emitting film. A pressure or vacuum transfer mold may be used.

In micro-scale transfer molding, molten polymer or pre-polymer is held in a transfer chamber. The light-emitting film is placed in the chamber of the mold along with a metal foil along one or more side surfaces of the light-emitting film. The mold is closed, and vacuum may be applied to help draw the metal foils to the side surfaces. Molten polymer or prepolymer is simultaneously or subsequently injected into channels along one or more side surfaces of the light-emitting film to coat the metal foil with polymer and adhere the metal foil to the side surfaces of the light-emitting film. A molded polymeric side surface layer may therefore be an endless layer about all of the side surfaces of the light-emitting film. A thermoplastic or thermoset polymer may be used to seal the side surfaces. PET is a particularly useful polymer for coating the side surfaces, since PET is also often present at each major surface of the light-emitting film. The PET of a layer on the major surface of the light-emitting film and the PET of the side surface layer can adhere to bond the layers together.

Alternatively, a metal layer may be applied to side surfaces as one or more metal films, and a single endless polymer layer may be simultaneously or subsequently applied to the side surfaces over the metal film or films.

One or more side surfaces of the light-emitting film may additionally or instead be coated with a metallic ink that is applied using a roller or that is sprayed on the side surface, for instance. An ink jet printer may be used to apply a metallic ink to one or more side surfaces of the film. The ink may contain e.g. aluminum, silver, copper, gold, or nickel alone or in any combination of these metals. The solvent may be removed using heat and/or vacuum to vaporize the solvent, leaving a metal layer upon one or more side surfaces of the light-emitting film.

Figure 4B:
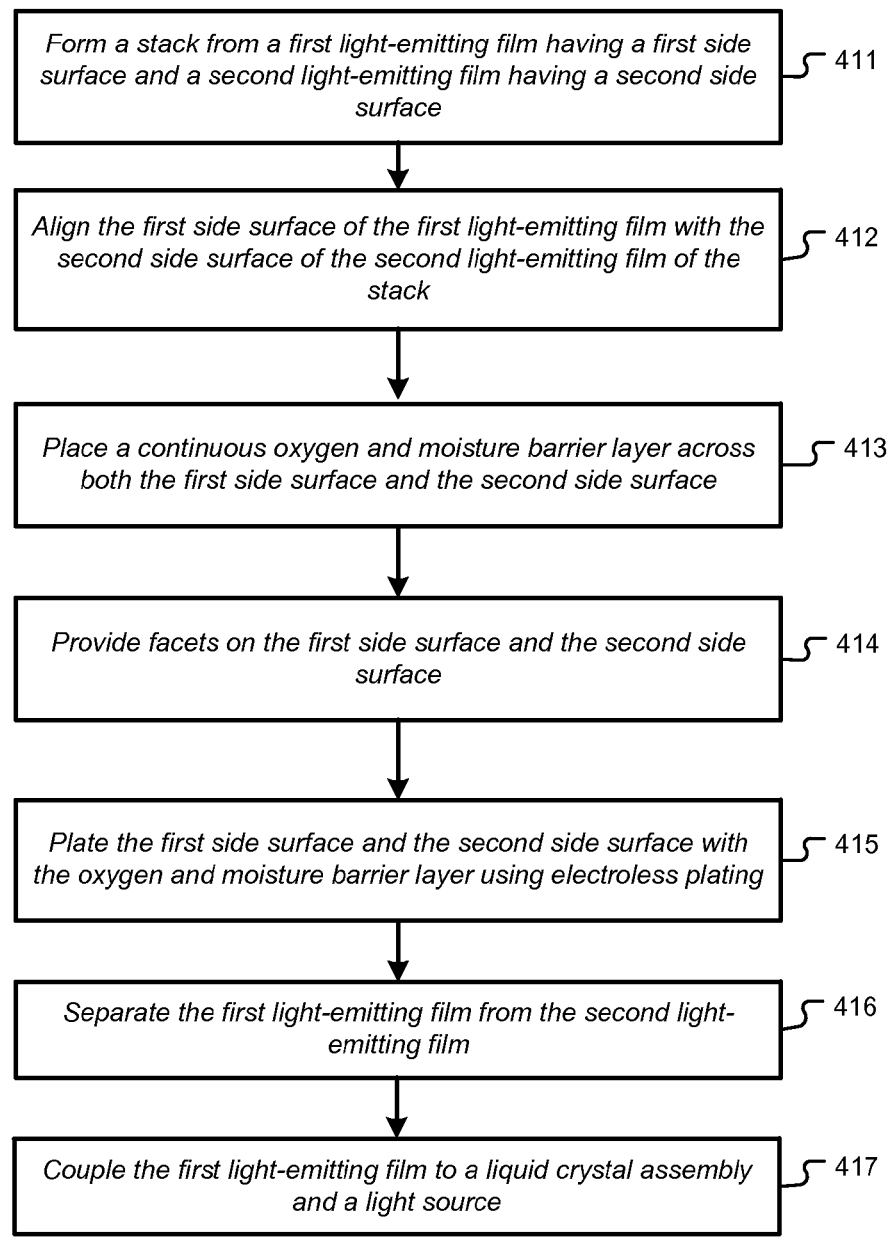

An individual light-emitting film may have an oxygen and moisture barrier layer applied to the film's side surfaces in a transfer mold or printer. Alternatively and as depicted in the method 410 shown in FIG. 4B, a stack of light-emitting films may have an oxygen and moisture barrier applied to the film's side surfaces in a transfer mold and/or printer.

A light-emitting polymer is often formed as a large roll or sheet for sake of economy and easier material handling. In step 411, a roll or large sheet of light-emitting polymer may be formed into a stack of light-emitting polymer films by cutting the roll or sheet to form individual films and stacking the individual films. The stack may also be formed by stacking multiple sheets of light-emitting polymer and cutting the stack to form a stack of light-emitting polymer films, each film having a size suited for incorporation into an electronic device. The stack may then be side surface-coated using various methods discussed below.

In step 412, a stack of films is placed in a transfer mold so that the first side surfaces of all films are aligned with one another, the second side surfaces of all films are aligned with one another, the third side surfaces of all films are aligned with one another, the fourth side surfaces of all film are aligned with one another, and so forth, depending on the number of side surfaces that individual films have. In step 413, a continuous oxygen and moisture barrier layer may be placed across the side surface of one or more of the stacked layers of film. This may be accomplished by placing the stack of films in a transfer mold along with a single metal foil that covers at least all of the first side surfaces of the films. The single metal foil may optionally be long enough to cover first and second side surfaces of the films, first, second, and third side surfaces of the films, or first, second, third, and fourth side surfaces of the films. The metal film may or may not be laminated to the side surfaces prior to placing the stack in the transfer mold.

A polymer layer may be applied to at least all of the first side surfaces of the stack of light-emitting films in the transfer mold. The resultant stack consequently has a single polymer layer along all of the first side surfaces of the films of the stack. The resultant stack may have a single polymer layer along all of the first and second side surfaces of all of the light-emitting films, along first and third side surfaces of all of the films, along first, second, and third side surfaces of all of the films, or along first, second, third, and fourth side surfaces of all of the films.

A metal film may be applied to a light-emitting film's side surface or a stack of films' common side surfaces in a mold by e.g. applying sound waves or other vibrational energy to the side surface and/or metal film and heating the side surface of the light-emitting film to join the metal film to the light-emitting film's side surface.

A metal film may be applied to a light-emitting film's side surface or a stack of light-emitting film's common side surfaces by sputtering a layer of metal upon the side surfaces facing the sputtering source in any instance above rather than applying a metal foil. The film or stack of films may be turned to sputter-coat other side surfaces. A metal foil and/or polymer may additionally be applied, if desired, using any of the methods discussed above.

Side surface-sealed light-emitting films may also be made in steps 405 and 415 by e.g. electroless plating a metal such as nickel, copper, or both onto side surfaces of the films. Side surfaces of the films may be roughened to promote metal adhesion by e.g. laser-ablating the side surfaces prior to electroless plating. A polymer may also be adhered to the side surface-deposited metal film of each light-emitting film using transfer molding, for instance, or other method discussed above.

For instance, laser-direct structuring or laser-induced selective activation may be used to apply a metal film to one or more side surfaces of a film or stack of films. In each method, one or more side surfaces of a film or stack of films is modified using a laser to release a metal atom and/or make the film side surfaces rougher and/or porous. A first material is either present in the polymer (LDS) or is applied (LISA) in similar manner as a metal strike is applied in electroless plating, and in both methods, a metal is deposited upon the first material to form a layer.

In LDS, a light-emitting film may have a filler material within the film that is activated by the laser's light. The filler material is located along at least the side surfaces of the light-emitting film, although the filler material may also be dispersed throughout the remainder of the light-emitting film. The filler material may be e.g. an organometallic complex such as a copper salt and/or an inorganic heavy metal-containing spinel compound. One or more side surfaces of the light-emitting film may be immersed in a bath that helps to rapidly absorb heat from the film during laser treatment. Laser light releases metal ions from the filler material, providing an activated metal upon which additional metal or metals may be deposited using an electroless plating process. For instance, copper may first be deposited upon the activated metal, followed by nickel and optionally gold. Other metals that may be deposited include tin, silver, and palladium/gold, and these may be coated with e.g. an organic solderability preservative if desired.

In LISA, the light-emitting film may or may not contain a filler material as described. One or more side surfaces of the light-emitting film are immersed in a bath, and laser light may roughen and/or make porous the side surfaces while the bath cools the polymer to maintain the roughened and/or porous texture. Metal ions of e.g. tin are deposited from solution on one or more side surfaces of the light-emitting film, providing an activated metal upon which additional metal may be deposited using an electroless plating process. Other metals and materials may be deposited as discussed above for LDS.

A stack resulting from any of these methods may therefore have a single metal film and single polymer film along all of the first side surfaces of the films of the stack. The resultant stack may have a single metal film and single polymer film along all of the first and second side surfaces of all of the films, along first, second, and third side surfaces of all of the films, or along first, second, third, and fourth side surfaces of all of the films.

A stack of light-emitting films with aligned side surfaces may have an oxygen and moisture barrier layer comprised of a metal oxide and polymer applied to side surfaces. The stack may be secured in a holder so that film side surfaces are exposed, and a metal oxide-containing polymer layer may be laminated to the side surfaces using a laminator. A metal layer may be likewise laminated onto the side surfaces to provide an oxygen and moisture barrier layer, either before, after, or instead of the metal oxide layer.

The individual light-emitting films of a stack may be separated in step 416 by slicing the polymer and/or metal film along individual side surfaces to free each side surface-sealed light-emitting film from the stack.

A stack of light-emitting films may be provided as a packaged combination. For instance, a side surface-coated stack may be placed in a tray or other packaging and shipped to a site where the light-emitting films are incorporated into electronic devices. The side surface-coated stack may have one or more oxygen and moisture barrier layers on side surfaces of each light-emitting film so that each film may be easily separated from the other films and used. Alternatively, the side surface-coated stack may have an oxygen and moisture barrier layer that spans all first side surfaces of the light-emitting films, and the films are separated from one another by e.g. slitting the barrier layer to enable each light-emitting film to be separated from the other. The stack may be packaged in an inert atmosphere such as nitrogen or in air, or the stack may be packaged in a vacuum and the packaging sealed, for instance. In step 406 shown in FIG. 4A and step 417 shown in FIG. 4B, the light-emitting film may be coupled to a liquid crystal display assembly and a light source.

Figure 2:
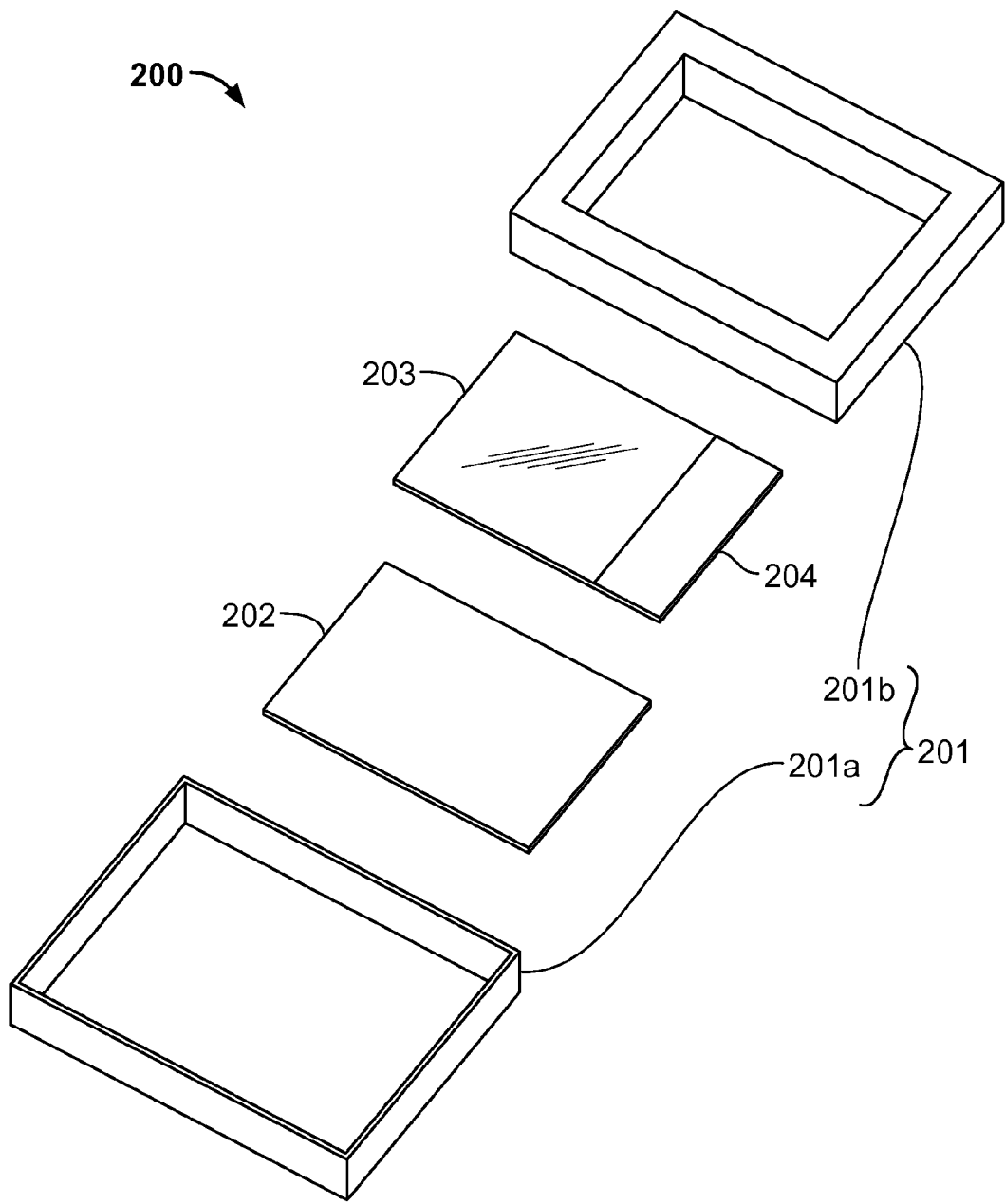
FIG. 2 is an exploded view of an electronic device that uses a light-emitting film in its display.

FIG. 2 is an exploded view of a light-emitting film-containing electronic device, such as an electronic book and media reader 200. The reader has a housing 201 formed of two pieces, lower housing piece 201a and upper housing piece 201b. The reader also has electronic circuitry having transistors and at least one microprocessor, in this case on a printed circuit board 202. The reader has a display 203 formed with a light-emitting film and, in this instance, a separate control pad 204 for controlling various functions of the reader.

Figure 3:
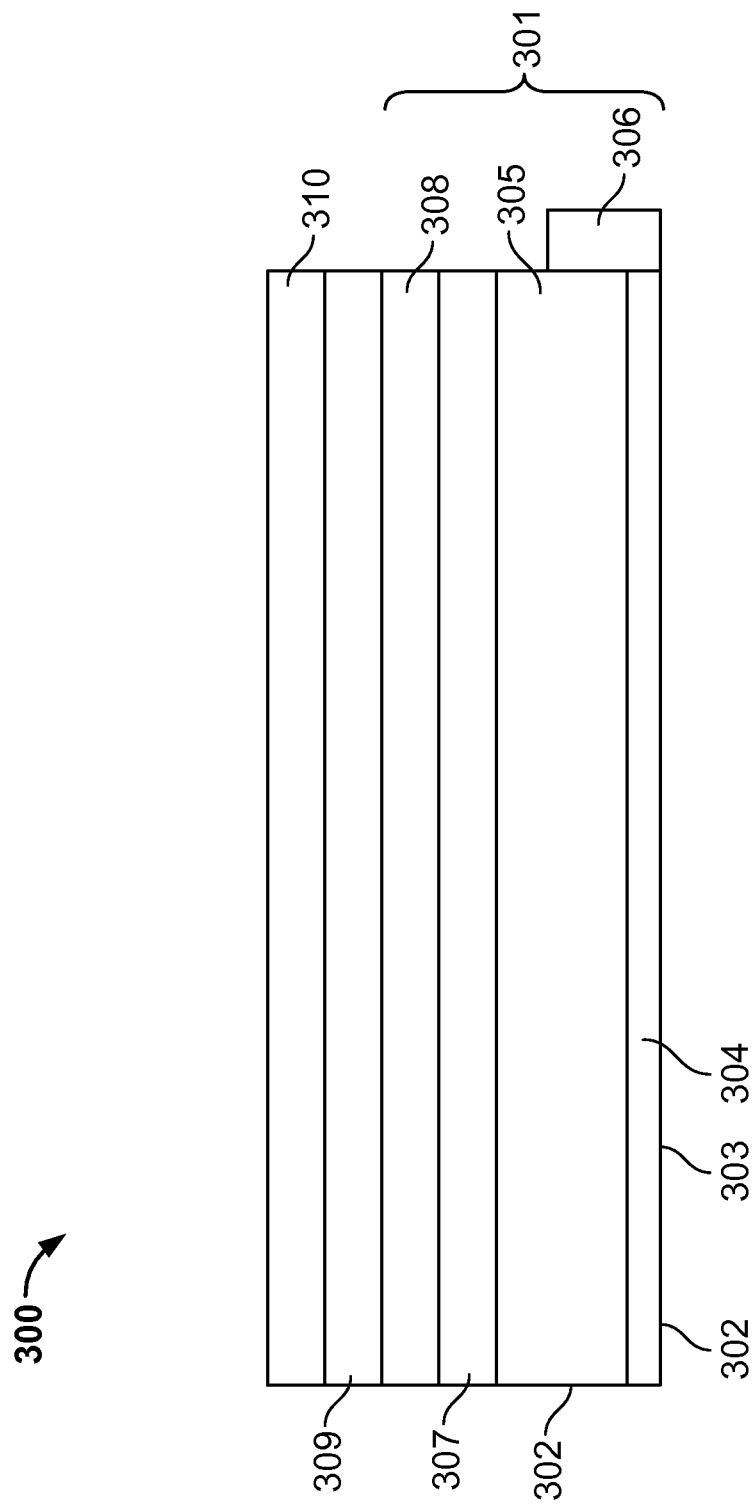
FIG. 3 is an edge view of a display having a light-emitting film, where a portion of the frame is removed in this view so that various components of the display are viewed more easily.

FIG. 3 is an edge view of portions of a display 300 (display 203 of FIG. 2 being one such example of a display). Backlight assembly 301 has a frame 302 with a metal back-plane 303 and a reflective film 304 on the back-plane. A polymeric light guide 305 resides above the reflective film 304. LED light bar 306 illuminates the light guide both directly and by light reflected from reflective film 304. A polymeric light-emitting film 307 resides above light guide 305 and receives light from the light guide. One or more optional brightness-enhancing films 308 reside above light-emitting film 307, and liquid crystal assembly 309 which may contain polarization films is positioned either above light-emitting film 307 as illustrated or is positioned between light-emitting film 307 and light guide 305 in an alternative embodiment. This configuration provides an edge-lit display, although the display may instead be back-lit by one or more light bars between reflective film 304 and light guide 305. An optional light mask 310 is positioned above the light-emitting film and, in this instance, is positioned above liquid crystal assembly 309.

The light-emitting film in this instance contains quantum dots that absorb some of the light emerging from light guide 305 and convert this light to light of a longer wavelength. Light from LED light bar 306 may be predominantly blue for instance, and the quantum dots may convert some of the blue light to e.g. red and/or green light. Light-emitting film 307 consequently emits additional light not found in light emitted directly from light bar 306.

A display may have a backlight in instances where e.g. all side surfaces of the light-emitting film have a reflective metal layer. If using an edge-mounted light bar, the light bar may be mounted slightly above or below the light-emitting film so that light has an uninterrupted path into the film. A transparent oxygen and moisture barrier layer (such as a polymeric layer having metal oxide particles at a face as described previously) may be present on the light-emitting film's side surface adjacent to the light bar, and all other side surfaces may have a reflective metal film on them, for instance.

The light-emitting film can eliminate the need for a light diffuser in a display and/or the electronic device. A light diffuser is typically a portion of a display that provides more even illumination across the display's face. A light-emitting film can eliminate the need for a light diffuser, and therefore a display may lack a light diffuser.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

What is claimed is:

1. An apparatus, comprising:
    a display comprising:
        a light source;
        a light-emitting film coupled to the light source, said light-emitting film comprising a solid organic polymeric matrix and quantum dots dispersed within said solid organic polymeric matrix, the solid organic polymeric matrix having a first major surface and a second major surface opposing the first major surface, said solid organic polymeric matrix further having a first side surface, a second side surface, a third side surface, and a fourth side surface, each of the first, the second, the third, and the fourth side surfaces being perpendicular to the first major surface and the second major surface;
        an oxygen and moisture barrier layer coupled respectively to each of the first side surface, the second side surface, the third side surface, and the fourth side surface, wherein the oxygen and moisture barrier layer comprises a light-reflective metal to reflect light emitted by the light-emitting film; and
        a liquid crystal assembly coupled to the light-emitting film.

2. An apparatus according to claim 1, wherein said light-reflective metal is a foil.

3. An apparatus according to claim 1, wherein said oxygen and moisture barrier layer comprises a metalized polymer film.

4. An apparatus according to claim 1, wherein an oxygen transmission rate of the barrier layer is no more than about 1.5 mL/m$^2$·day and a moisture transmission rate of the barrier layer is no more than about 1.0 g/m$^2$·day.

5. A sheet of light-emitting film comprising:
    a solid polymeric matrix having a first major surface and a second major surface and having at least a first side surface at boundaries of the first and second major surfaces;
    a plurality of light emitters disposed within the polymeric matrix; and
    an oxygen and moisture barrier layer coupled to the first side surface, wherein said oxygen and moisture barrier layer coupled to the first side surface comprises at least one metal, and wherein said metal is a light-reflective metal to reflect light emitted by the plurality of light emitters.

6. A sheet according to claim 5 wherein said oxygen and moisture barrier layer comprises a polymer.

7. A sheet according to claim 5 wherein said oxygen and moisture barrier layer comprises a first polymer, wherein said first polymer is miscible in a second polymer at the first major surface.

8. A sheet according to claim 7 wherein the second polymer comprises a polymer layer at the first major surface.

9. A sheet according to claim 5, wherein said plurality of light emitters comprise a first plurality of quantum dots.

10. A sheet according to claim 5, wherein said plurality of light emitters comprises a plurality of organic light emitting devices.

11. A sheet according to claim 5, wherein an oxygen transmission rate of the barrier layer is no more than about 1.5 mL/m$^2$·day and a moisture transmission rate of the barrier layer is no more than about 1.0 g/m$^2$·day.

12. A sheet according to claim 5, wherein said oxygen and moisture barrier layer coupled to the first side surface comprises a light-reflective metal layer and a metal oxide layer.

13. A method comprising:
    providing a light-emitting film, the light-emitting film having a top surface, an opposing bottom surface, and at least one side surface orthogonal to the top surface and the bottom surface, wherein the light-emitting film includes a plurality of light emitters disposed within a polymeric matrix; and
    applying a barrier layer over the at least one side surface to prevent oxygen and moisture ingress via the at least one side surface, wherein said barrier layer comprises one or more of (a) a light-reflective metal foil to reflect light emitted by the light-emitting film or (b) a light-reflective metal oxide to reflect light emitted by the light-emitting film.

14. A method according to claim 13, wherein said barrier layer is applied using micro-scale transfer molding.

15. A method according to claim 13, further comprising coupling the light-emitting film to a liquid crystal assembly and a light source.

16. A method according to claim 13, wherein said side surface has facets so that said barrier layer engages said facets.

17. A method according to claim 13, wherein said barrier layer is applied by electroless plating of the barrier layer to cover the side surface.

18. A method according to claim 13, wherein said barrier layer is applied using sonic energy.

* * * * *